(12) United States Patent
Rathinasamy et al.

(10) Patent No.: US 12,436,776 B2
(45) Date of Patent: Oct. 7, 2025

(54) DISTRIBUTING ENDPOINT DEVICES CONFIGURATION VIA COORDINATOR DEVICE

(71) Applicant: Dell Products L.P., Round Rock, TX (US)

(72) Inventors: Shree Rathinasamy, Round Rock, TX (US); Maxim Balin, Gan-Yavne (IL); Eliyahu Rosenes, Bet Shemesh (IL)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 18/468,303

(22) Filed: Sep. 15, 2023

(65) Prior Publication Data

US 2025/0094179 A1    Mar. 20, 2025

(51) Int. Cl.
*G06F 9/445* (2018.01)
*G06F 8/65* (2018.01)

(52) U.S. Cl.
CPC ............ *G06F 9/44505* (2013.01); *G06F 8/65* (2013.01)

(58) Field of Classification Search
CPC .......... G06F 8/65; G06F 8/71; G06F 9/44505
USPC ......................................................... 713/100
See application file for complete search history.

(56) References Cited

U.S. PATENT DOCUMENTS

| | | | | |
|---|---|---|---|---|
| 12,131,140 B2* | 10/2024 | Nelson | .................. | G06F 21/577 |
| 12,192,240 B2* | 1/2025 | Kondapi | ............... | H04L 63/123 |
| 2024/0028715 A1* | 1/2024 | Hyatt | ...................... | G06F 8/61 |
| 2024/0152372 A1* | 5/2024 | Elshafey | ............. | G06F 9/45558 |
| 2025/0021214 A1* | 1/2025 | Ramaiah | ............... | G06F 3/0484 |
| 2025/0080344 A1* | 3/2025 | Bruno | .................. | H04L 9/0891 |

\* cited by examiner

*Primary Examiner* — Brian T Misiura
(74) *Attorney, Agent, or Firm* — WOMBLE BOND DICKINSON (US) LLP (57) ABSTRACT

Methods and systems for managing operation of endpoint devices are disclosed. The operation of the endpoint devices may be managed by distributing updates to the endpoint devices. To facilitate distribution, some endpoint devices may be grouped and one of the group may be selected to serve as a coordinating endpoint device. The coordinating endpoint device may serve as a single source of contact for a coordinator tasked with distributing updates to endpoint devices of the group. The coordinating endpoint device may obtain and distribute copies of the updates to recipient endpoint devices.

20 Claims, 7 Drawing Sheets

DISTRIBUTING ENDPOINT DEVICES CONFIGURATION VIA COORDINATOR DEVICE

FIELD

Embodiments disclosed herein relate generally to device management. More particularly, embodiments disclosed herein relate to systems and methods to distribute updates.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

To modify the computer implemented services provided by the endpoint devices, the software, configurations, and/or other aspects of the endpoint devices may need to be updated. To update the endpoint devices to provide the computer implemented services, updates may be distributed to the endpoint devices.

To limit computational overhead for distribution of updates and reduce the risk of compromise, some endpoint devices may be grouped. A coordinating endpoint device for the group may be selected. The coordinating endpoint device may serve as the point of contact for an orchestrator that manages the group of endpoint devices. The coordinator may send updates to the coordinating endpoint device. The coordinating endpoint device may distribute the update to corresponding recipient endpoint devices.

By limiting the distribution of updates, as discussed above, the overhead for securing the distribution process may be reduced. For example, the coordinating endpoint device may perform various security functions to reduce the likelihood of malicious updates being distributed. Further, by only having a single point of contact for a group, the overhead on the orchestrator may be reduced (e.g., by not needing to granularly distribute updates to various endpoint devices).

Thus, embodiments disclosed herein may address, among others, the technical problem of security in a distributed system. By limiting how updates are distributed, the distributed system may be less susceptible to compromise and the overhead for securing the distributed system may be reduced (e.g., when compared to requiring all endpoint devices to equally participate in various security functions). Consequently, the distributed system may have increased computing resource availability for providing computer implemented services while reducing the likelihood of compromises occurring.

In an embodiment, a method for managing operation of endpoint devices of a deployment (e.g., some edge infrastructure) is provided. The method may include obtaining, by an endpoint device of the endpoint devices, assignment instructions indicating a role of a coordinating endpoint device for the endpoint device; identifying, by the endpoint device while operating as the coordinating endpoint device, managed endpoint devices of the endpoint devices; obtaining, by the endpoint device while operating as the coordinating endpoint device, an update from an orchestrator, the update being for at least one of the managed endpoint devices; notifying, by the endpoint device while operating as the coordinating endpoint device, the at least one of the managed endpoint devices of the update; providing, by the endpoint device while operating as the coordinating endpoint device, a copy of the update to the at least one of the managed endpoint devices of the update in response to a request for the update from the at least one of the managed endpoint device to initiate updating of the at least one of the endpoint devices; and providing computer implemented services using the updated at least one of the endpoint devices.

The update may be encrypted and signed by the orchestrator. The update may not be decryptable by the endpoint device.

The update may be decryptable using a decryption key maintained by the at least one of the managed endpoint devices.

The method may also include, prior to obtaining the update: initiating, by the endpoint device while operating as the coordinating endpoint device, monitoring for the update in response to identifying the managed endpoint devices; and after identifying that the update is available from the orchestrator, requesting, by the endpoint device while operating as the coordinating endpoint device, the update from the orchestrator.

The copy of the update may be provided via a secure channel between the endpoint device and the at least one of the managed endpoint devices.

The update may be signed by orchestrator using a private key trusted by the at least one of the managed endpoint devices.

The orchestrator may be configured to only provide updates for the at least one of the managed endpoint devices to the endpoint device, and the orchestrator may not be configured to communicate with the at least one of the managed endpoint devices.

The at least one of the managed endpoint devices may be configured to only communicate with the endpoint device while operating as the coordinating endpoint device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Figure 1A:
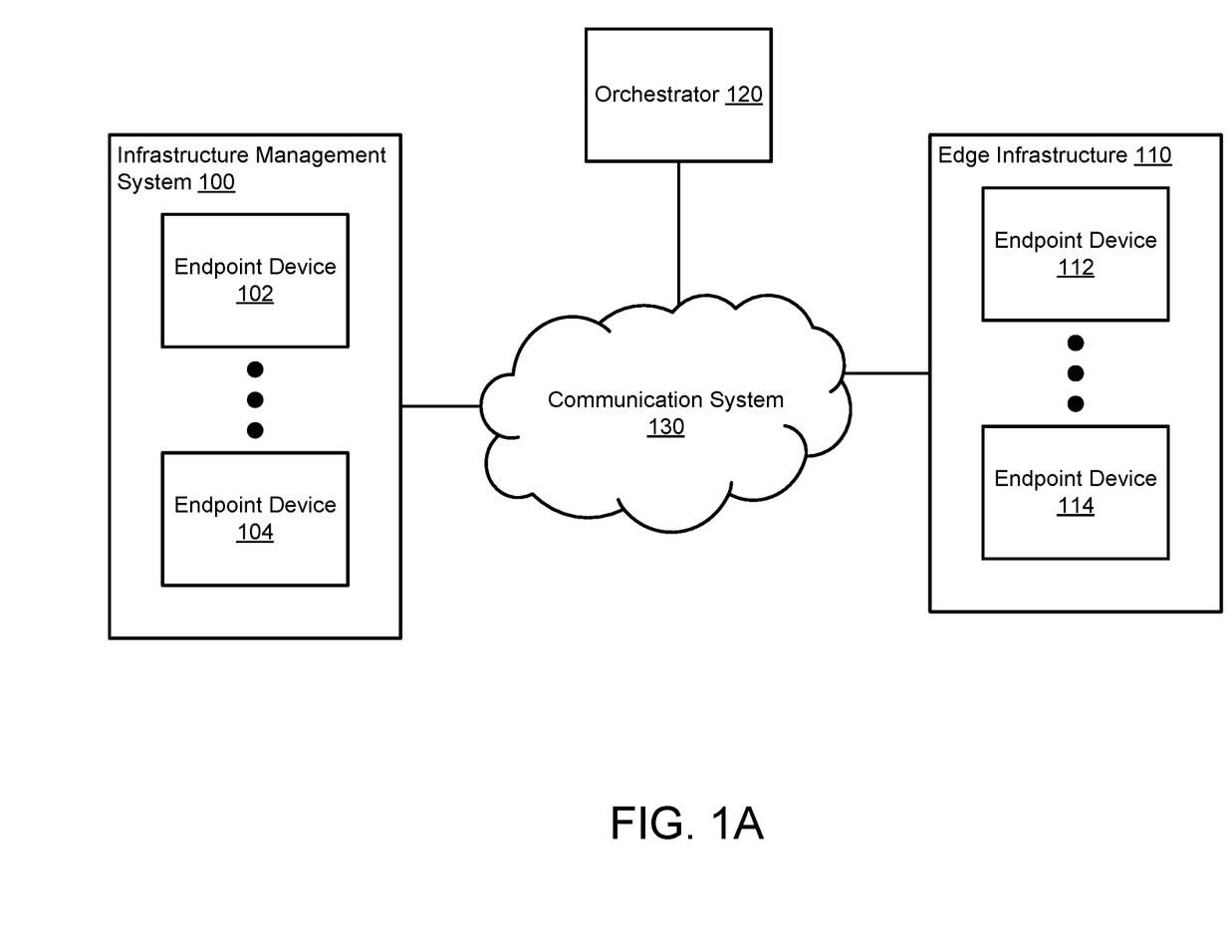
FIG. 1A shows a block diagram illustrating a system in accordance with an embodiment.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include edge infrastructure 110. Edge infrastructure 110 may include any number of endpoint devices (e.g., 112, 114). The endpoint devices may cooperatively and/or individually provide all, or a portion of the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services. Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided.

However, due to the placement of endpoint devices (e.g., at an edge installation) and the resources of the endpoint devices, the endpoint devices may be more susceptible to malicious activity. For example, any of the endpoint devices may be part of an edge installation which may subject the endpoint devices to physical attacks (e.g., malicious devices may be operably connected to the endpoint devices by attaching the malicious device to a port of a network interconnecting the endpoint devices), network attacks (e.g., networks that support operation of the edge installation may include fewer security mechanisms than would be present in other computing environments such as data centers), and/or the endpoint device may be subject to more vectors of attack for other reason when compared to computing devices located in other computing environments.

Further, by virtue of the expanded number of attack vectors, the need to modify (e.g., install software, change configuration settings) the endpoint devices to provide the desired computer implemented services in combination with may subject the endpoint devices to higher risk of compromise. For example, to modify the operation of the endpoint devices, information regarding the modifications may be transmitted to the endpoint devices because the endpoint devices may be remote to other computing resources, administrators tasked with managing the endpoint devices, etc. A malicious device may attempt to utilize these communications of modifications as an additional vector of attack. The malicious device may attempt to impersonate a management device that manages the endpoint devices with respect to modification, another endpoint device, etc.

In general, embodiments disclosed herein may provide methods, systems, and/or devices for managing the operation of edge infrastructure. To manage the edge infrastructure, a security framework for modifying the edge infrastructure to provide various computer implemented services may be enforced. The security framework may divide the endpoints of edge infrastructure into groups, and one endpoint device of each group may be selected as a leader of the group.

The leader of the group may manage all communications with higher level management entities such as orchestrators. The other members of the group may rely on the leader to obtain and relay updates to the other members.

The updates may be secured with encryption, and signed using keys trusted by the endpoint devices of the edge infrastructure. For updates specific to one endpoint device of a group, the updates may be encrypted with a cypher specific to that endpoint. For updates for multiple endpoint devices of a group, the updates may be encrypted with a cypher specific to those multiple endpoint devices. Consequently, if the updates are inadvertently provided to other devices (malicious or friendly), the updates may not be utilized.

By doing so, embodiments disclosed herein may provide a system that is more likely to provide desired computer implemented services by reducing the likelihood of members of the system being compromised.

To provide the above noted functionality, the system of FIG. 1A may include infrastructure management system 100, edge infrastructure 110, orchestrator 120, and communication system 130. Each of these components is discussed below.

Infrastructure management system 100 may facilitate modification of edge infrastructure 110. Infrastructure management system 100 may include any number of data processing systems (e.g., 102, 104). The data processing systems may be used by administrators and/or other persons that manage edge infrastructure 110 to provide desired computer implemented services.

The administrators may be tasked with establishing (i) updates for endpoint devices of edge infrastructure 110, and (ii) distribution of the updates to the endpoint devices to update the operation of the endpoint devices. The updates may include any type of updates. For example, some updates may include changes to communication information such as networking related information (e.g., network addresses of trusted entities, communication protocol information, etc.), changes to software hosted by the endpoint devices (e.g., security patches, version updates, etc.), and/or other types of updates for the operation of the endpoint devices of edge infrastructure 110. The resulting updates may be specific to one or more of the endpoint devices.

Figure 1B:
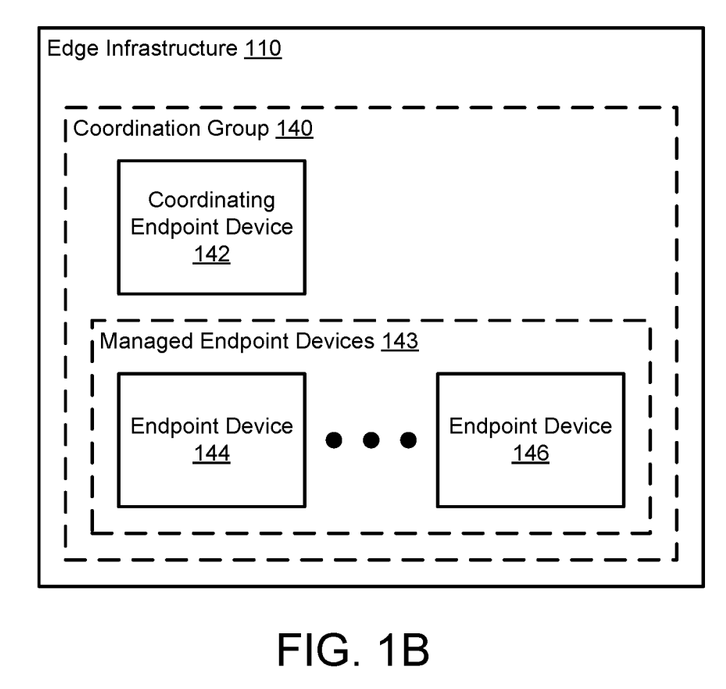
FIG. 1B shows a block diagram illustrating edge infrastructure in accordance with an embodiment.

To define and/or deploy an update, the administrators may use a portal or other interface provided by orchestrator 120. The portal may be used by the administrators to initiate modification of an endpoint device based on an update. When doing so, the orchestrator may identify membership of the destination endpoint device in a group and route the update through a coordinating endpoint device of the group. Refer to FIG. 1B for additional details regarding coordinating endpoint devices, and FIG. 2C for additional details regarding deploying updates for endpoint devices.

Figure 2A:
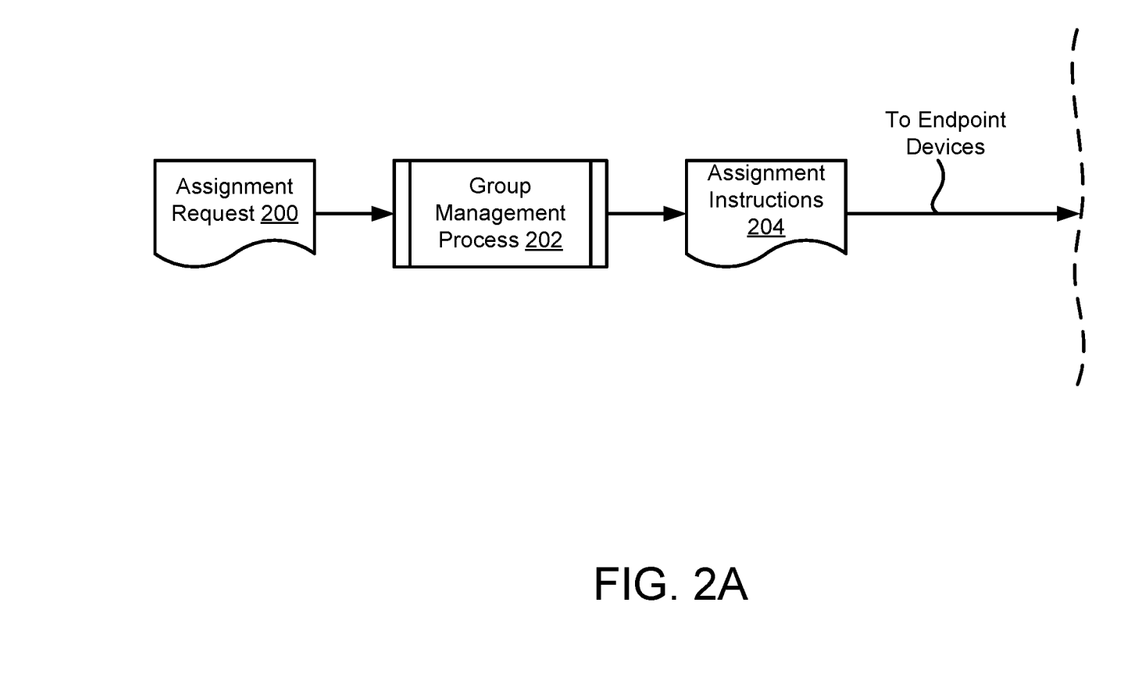
FIGS. 2A-2B show data flow diagrams in accordance with an embodiment.
Figure 2B:
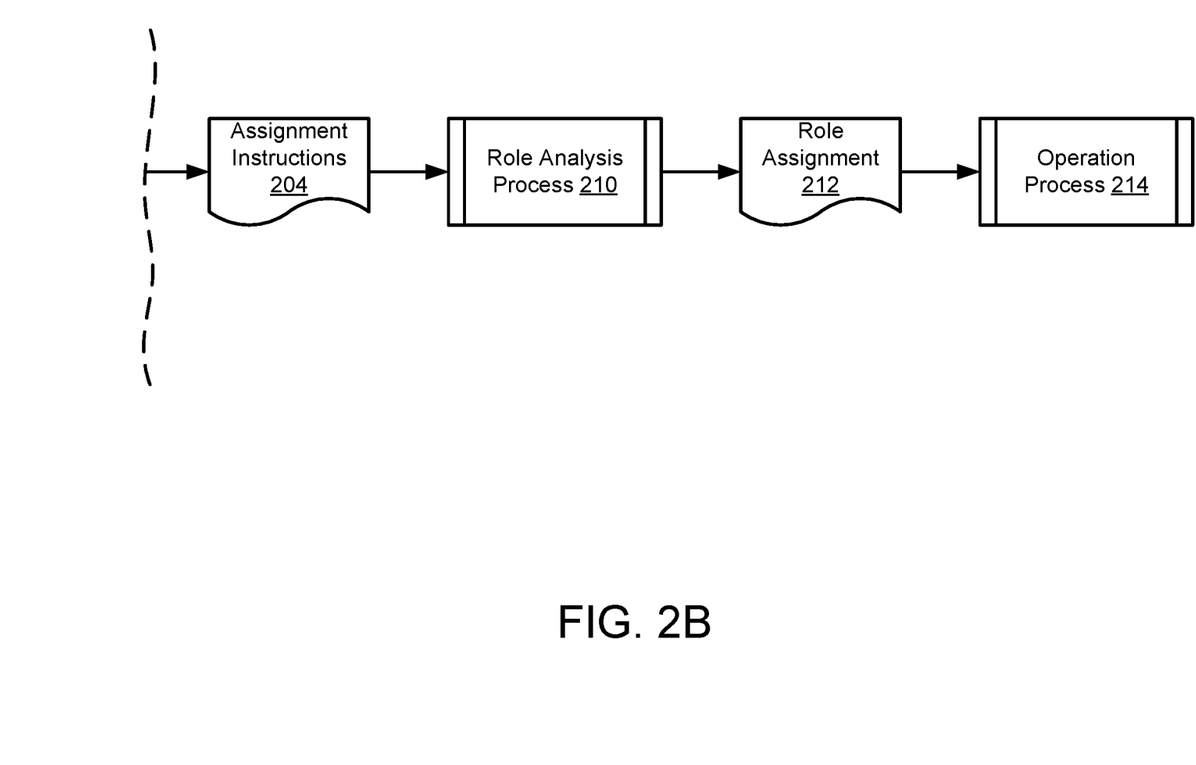

In advance of deploying an update, the administrator may also use the portal to define member of endpoint devices in different groups and select coordinating endpoint devices in the group. For example, orchestrator 120 may provide information regarding the endpoint devices usable by the administrator to define groups and coordinating endpoint devices to accomplish various goals (e.g., administrators may select group membership based on goals to be accomplished by the group). Refer to FIGS. 2A-2B for additional details regarding establishing groups of endpoint devices.

Figure 2C:
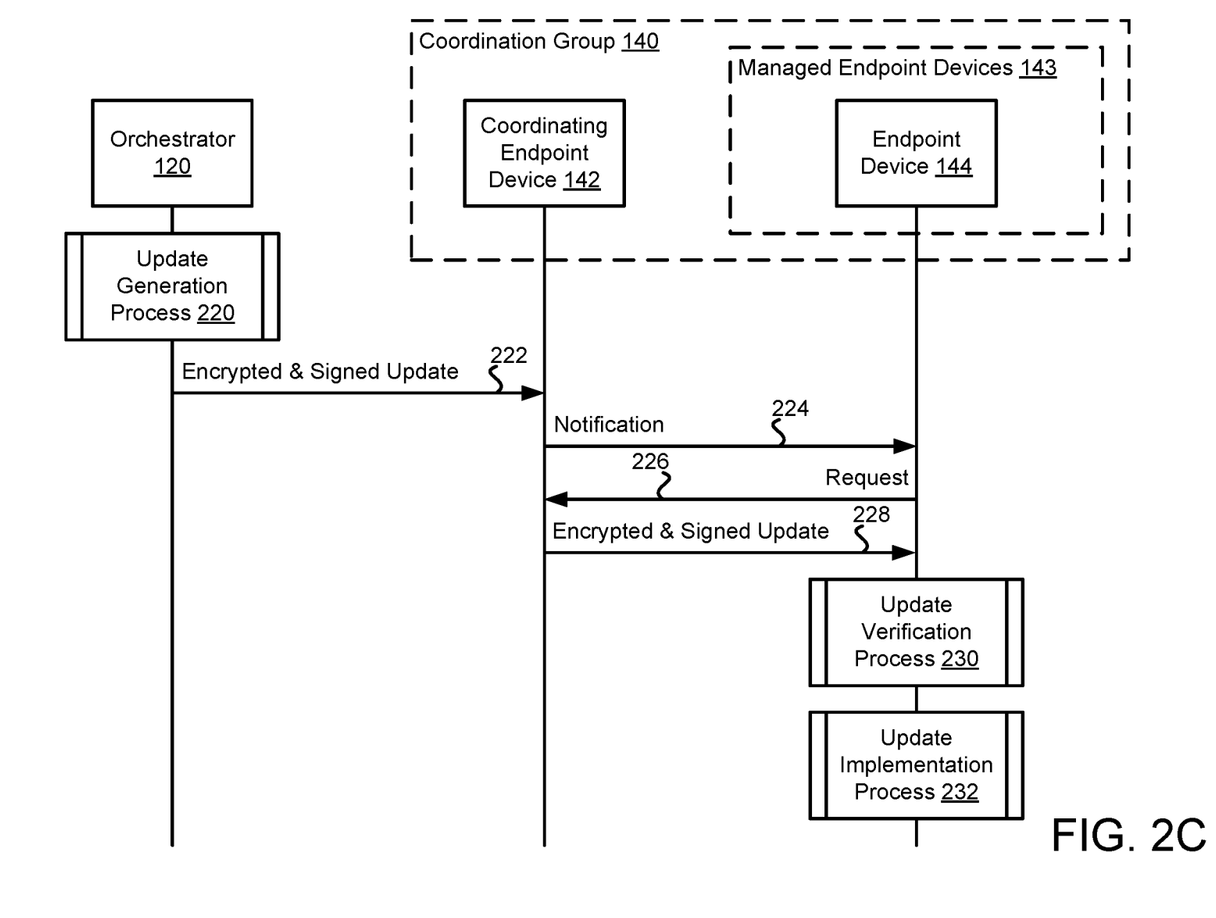
FIG. 2C shows an interaction diagram in accordance with an embodiment.

Orchestrator 120 may manage edge infrastructure 110. To manage edge infrastructure 110, orchestrator 120 may present interfaces to users of data processing systems 102-104 of infrastructure management system 100. The interfaces may allow privileged users (e.g., administrators, architects, etc.) to (i) define groups of endpoint devices, (ii) define coordinating endpoint devices for the groups, and (iii) deploy updates to endpoint devices of the groups. Refer to FIGS. 2A-2C for additional details regarding management of edge infrastructure by orchestrator 120.

Edge infrastructure 110, as noted above, may provide computer implemented services. To provide the computer implemented services, the endpoint devices of edge infrastructure 110 may (i) implement a security framework, and (ii) use updates from orchestrator 120 to update their operation.

The security framework may define how each endpoint device interacts with other devices based on roles within groups. For coordinating endpoint devices, the security framework may indicate that each coordinating endpoint device to is to (i) query orchestrator 120 for updates for members of a group, (ii) notify other members of a group when new updates for them are obtained, and (iii) provide copies of the updates to the other members of the group.

For non-coordinating endpoint devices, the security framework may indicate that each non-coordinating endpoint device is to (i) obtain copies of the updates from the coordinating endpoint device of a group, (ii) verify trust and integrity of the updates, and (iii) for verified updates, implement the updates. To implement the updates, each endpoint device may host automation software through which updates may be used to modify themselves through, for example, deployment of new software, removal/modification of existing software, modification of various configurations, etc.

Additionally, depending on the role within a group, the security framework may require that each endpoint device implement various restrictions on the ability of the endpoint device to communicate with other devices. For example, non-coordinating endpoint devices may limit their communications (e.g., through packet screening) to the coordinating endpoint devices of a group. If present on a local area network (or other type of layer 2 network that may bridge communications out), the non-coordinating endpoint devices may disable internet protocol (IP) communications, and may only process local communications (e.g., media access control (MAC) layer 2 communications). In contrast, coordinating endpoint devices may implement a full transmission control protocol/internet protocol (TCP/IP) stack to facilitate communications with orchestrator 120 via communication system 130.

Figure 3:
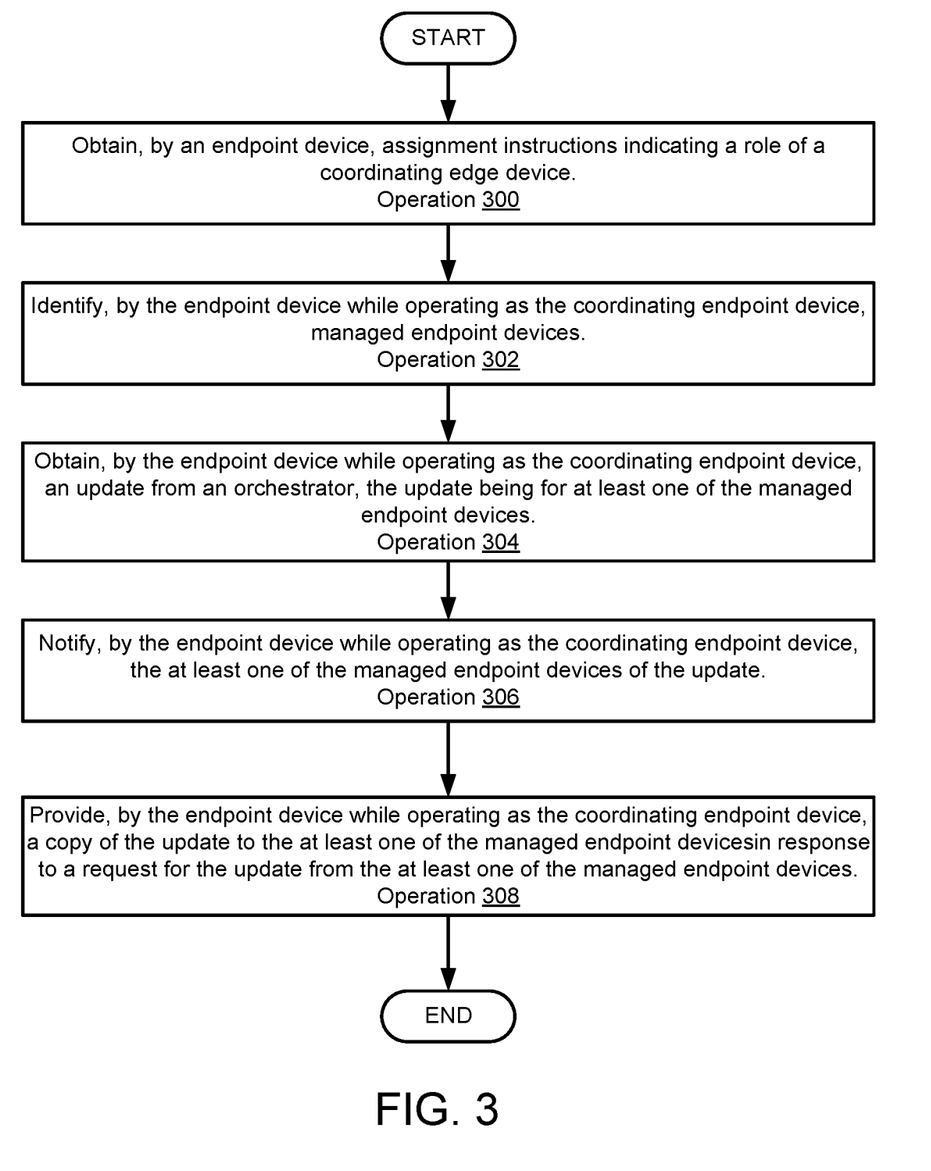
FIG. 3 shows a flow diagram illustrating a method in accordance with an embodiment.

When providing their functionality, any of (and/or components thereof) infrastructure management system 100, edge infrastructure 110, and/or orchestrator 120 may perform all, or a portion, of the actions and methods illustrated in FIGS. 2A-3.

Any of (and/or components thereof) infrastructure management system 100, edge infrastructure 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

As discussed above, the endpoint devices of edge infrastructure 110 may be grouped to facilitate management and reduce the risk of compromise of these devices. Turning to FIG. 1B, a block diagram of an example implementation of edge infrastructure 110 in accordance with an embodiment is shown.

As seen in FIG. 1B, to facilitate management of endpoint devices, a portion of the endpoint devices may be added to coordination group 140. Coordination group 140 may be a logical delineation of some of the endpoint devices of edge infrastructure 110. The membership in coordination group 140 may be specified by an administrator, and may be implemented by an orchestrator. Refer to FIG. 2A for additional detail regarding establishing coordination group 140.

To manage coordination group 140, one of the endpoint devices may be given a role of coordinating endpoint device 142. Coordinating endpoint device 142 may manage distribution of updates from an orchestrator to non-coordinating endpoint devices (e.g., managed endpoint devices 143). Refer to FIGS. 2A-2B for additional details regarding establishing coordinating endpoint device 142.

The remaining members of coordination group 140 may take on the role of managed endpoint devices 143. Any number (e.g., 144-146) of endpoint devices may take on such a role within the group. Each of managed endpoint devices 143 may rely on coordinating endpoint device 142 for updates. Refer to FIG. 2C for additional details regarding distribution of updates to managed endpoint devices 143.

While illustrated with a single coordination group 140, it will be appreciated that edge infrastructure 110 may include any number of coordination groups, which may include similar and/or different numbers of endpoint devices. Additionally, while illustrated with a single coordinating endpoint device 142, it will be appreciated that coordination group 140 may include multiple coordinating endpoint devices. For example, the coordinating endpoint devices of a coordination group may serve as a high availability group to facilitate distribution of updates to large numbers of managed endpoint devices 143 and/or for redundancy purposes.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 204, etc.) is used to represent data structures, and a second set of shapes (e.g., 202, 210, 214, etc.) is used to represent processes performed using and/or that generate data.

Turning to FIG. 2A, a first data flow diagram in accordance with an embodiment is shown. The first data flow diagram may illustrate data used in and data processing performed in establishment of a coordination group and/or role assignment for a coordination group.

To establish a coordination group and/or update roles, an administrator or other person may utilize a portal provided by an orchestrator. Through the portal, the person may provide assignment request 200 to the orchestrator. Assignment request 200 may specify (i) members of a coordination group, and/or (ii) role assignments for the members.

For example, the portal may present available endpoint devices for assignment to a coordination group, characteristics (e.g., available computing resources, existing duties, available communication bandwidth, etc.) of the endpoint devices, and/or other information usable by the person to make selection decision with respect to membership in the coordination group and roles of members of a coordination group.

Assignment request 200 may be ingested by group management process 202. During group management process 202, assignment instructions 204 may be generated. Assignment instructions 204 may indicate how the respective endpoint devices are to be reconfigured to take on corresponding roles within the coordination group. For example, assignment instructions 204 may specify software components to be deployed, configurations to modify, and/or other changes to be made to conform the operation of each endpoint device to a given role and cooperative action as a member of a coordination group.

Once obtained, assignment instructions 204 and/or information based on assignment instructions 204 may be provided to the endpoint devices that will be members of the coordination group.

Thus, via the flow shown in FIG. 2A, a coordination group may be created/updated, and roles within the group may be established.

Turning to FIG. 2B, a second data flow diagram in accordance with an embodiment is shown. The second data flow diagram may illustrate data used in and data processing performed in conforming the operation of an endpoint device to that required to perform a role within a coordination group.

To conform the operation of the endpoint device to the role, assignment instructions 204 and/or information based on instructions 204 may be obtained by each endpoint device of a coordination group (and/or any members being updated). The information may be ingested to role analysis process 210 to obtain a role assignment 212 for the endpoint device. Role assignment 212 may be obtained by extracting the information from assignment instructions 204 specific to that endpoint device. For example, assignment instructions 204 may include information for each endpoint device of a coordination group. Role assignment 212 may only include the information relevant to a particular endpoint device.

Once obtained, role assignment 212 may be used to update operation process 214 performed by an endpoint device. Operation process 214 may reflect the general operation of an endpoint device due to the software components hosted by configurations of, and/or other characteristics of the endpoint device. These pieces of software, configurations, and/or other characteristics may be modified to match the role assignment (e.g., 212) for the endpoint device.

For example, if the role assignment is a coordinating endpoint device, then the configuration of the endpoint device may be updated to facilitate communication with an orchestrator and member endpoint devices of a group. Likewise, an agent or other software may be installed to scan for updates for members of the group available from the orchestrator, obtain copies of the updates, notify the corresponding endpoint devices of the updates, and provide the updates to the corresponding endpoint devices.

In contrast, if the role assignment is a managed endpoint device, then the configuration of the endpoint device may be updated to limit communication with devices other than the coordinating endpoint device of a group, to obtain updates from the coordinating endpoint device, to verify and implement verified updates, etc.

Operation process 214 may be updated, for example, by implementing the role assignment with automation software that may automatically deploy software, modify configuration, and/or perform other actions based on role assignment 212.

Thus, via the data flow shown in FIG. 2B, members of a group may conform their operation to assigned roles.

Once the roles of a group are in place, various updates may be deployed to members of the group.

To further clarify embodiments disclosed herein, an interactions diagram in accordance with an embodiment is shown in FIG. 2C. The interaction diagram may illustrate example of how data may be obtained and used within the system of FIG. 1A.

In the interaction diagram, processes performed by and interactions between components of a system in accordance with an embodiment are shown. In the diagrams, components of the system are illustrated using a first set of shapes (e.g., 120, 142, 144, etc.), located towards the top of the figure. Lines descend from these shapes. Processes performed by the components of the system are illustrated using a second set of shapes (e.g., 220, 230, etc.) superimposed over these lines. Interactions (e.g., communication, data transmissions, etc.) between the components of the system are illustrated using a third set of shapes (e.g., 222, 224, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 222 may occur prior to the interaction labeled as 224. However, it will be appreciated that the processes and interactions may be performed in different orders, any may be omitted, and other processes or interactions may be performed without departing from embodiments disclosed herein.

Turning to FIG. 2C, a first interaction diagram in accordance with an embodiment is shown. The first interaction diagram may illustrate processes and interactions that may occur during deployment of updates to endpoint devices.

To deploy an endpoint device, orchestrator 120 may perform update generation process 220. During update generation process 220, information regarding an update may be obtained. The information may be obtained by reading it from storage, receiving it from another device, generation based on user input, and/or via different modalities. For example, an administrator or other person may use a portal provided by orchestrator 120 to provide the information.

Once obtained, an update may be generated based on the information. The update may specify, for example, changes to software, configurations, and/or other characteristics of an endpoint device. The update may be generated based on a template, schema, and/or other type of pattern through which the information may be used to obtain the update.

Once obtained, the update may be signed using a private key maintained by orchestrator 120. A public key corresponding to the private key may be published for use by endpoint devices.

Additionally, the signed update may be encrypted using a cypher. The cypher may be selected from a library of cyphers. The selected cypher may be specific to the endpoint device(s) for which the update is generated. Likewise, specific encryption keys may be used as part of the selected cypher, with corresponding decryption keys being available to the endpoint devices that will receive the update. Thus, the encrypted updated may only be decryptable by the intended recipient.

Once encrypted, the encrypted and signed update may, at interaction 222, be sent to coordinating endpoint device 142. In this example, coordinating endpoint device 142 may be a member of a group that includes endpoint device 144, and endpoint device 144 may be the intended recipient of the update. When provided to coordinating endpoint device 142, metadata reflecting that endpoint device 144 is the intended recipient may be provided along with the encrypted and signed update.

After obtaining the encrypted and signed update, at interaction 224, coordinating endpoint device 142 may notify endpoint device 144 of the available update. Based on the notification, at interaction 226, endpoint device 144 may request access to the update. In response to the request, coordinating endpoint device 142 may provide the encrypted and signed update 228 to endpoint device 144.

Once the encrypted and signed update is obtained, endpoint device 144 may perform update verification process 230. During update verification process 230, the encrypted and signed update may be decrypted (e.g., using a corresponding cypher and decryption keys), and a signature of the update may be verified to establish trust in the update and integrity of the payload (e.g., the instructions for the update). The signature may be verified by performing a signature verification algorithm using a trusted public key (e.g., published by orchestrator 120, and correspond to a private key used to generate the signature). The signature verification algorithm may also verify integrity of the signed payload, in this example, the update.

Presuming that trust in the update can be established and the integrity of the update can be verified, update implementation process 232 may be performed. During update implementation process 232, the update may be implemented by endpoint device 144. For example, the update may be provided by automation software hosted by endpoint device 144. The automation software may apply the update to reconfigure endpoint device 144 to conform its operation to that expected based on the update.

Once updated, computer implemented services may be provided by endpoint device 144 using the newly applied update. For example, depending on content of the update, different types or manners of providing computer implemented services may be used by endpoint device 144 following application of the update to endpoint device 144.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via the interactions and processes shown in FIG. 2C, a system in accordance with embodiments disclosed herein may facilitate application of updates to endpoint devices in a manner that reduces the susceptibility of the endpoint devices to compromise.

While illustrated in FIG. 2C with respect to a single managed endpoint device (e.g., 144), it will be appreciated that coordination group 140 may include multiple manage endpoint devices. Additionally, while described with respect to an update directed to a single endpoint device, similar distribution processes may be used to distribute a single update to multiple recipient endpoint devices. For example, multiple notifications may be provided to each recipient endpoint device thereby allowing each recipient endpoint device to obtain copies of the encrypted and signed update.

As discussed above, the components of FIG. 1A may perform various methods to manage operation of endpoint devices through application of updates. FIG. 3 illustrates a method that may be performed by the components of the system of FIG. 1A. In the diagram discussed below and shown in FIG. 4, any of the operations may be repeated, performed in different orders, and/or performed in parallel with or in a partially overlapping in time manner with other operations.

Turning to FIG. 3, a flow diagram illustrating a method for applying updates to endpoint devices in accordance with an embodiment is shown. The method may be performed by any of (and/or components thereof) infrastructure management system 100, edge infrastructure 110, orchestrator 120, and/or other components of the system shown in FIG. 1A.

At operation 300, assignment instructions indicating a role for an endpoint device is obtained. The role may be a coordinating endpoint device. The assignment instructions may be obtained by receiving them from an orchestrator that manages the endpoint device.

The endpoint device may implement the assignment instructions and begin to operate as the coordinating endpoint device.

At operation 302, managed endpoint devices are identified. The managed endpoint devices may be identified based on the assignment instructions. The assignment instructions may specify roles for endpoint devices of a group of which the endpoint device is a member.

At operation 304, an update is obtained from an orchestrator. The update may be for at least one of the managed endpoint devices. The update may be obtained by (i) monitoring the orchestrator for new updates, (ii) when a new update is found based on the monitoring, requesting the new update, and (iii) receiving the update from the orchestrator.

At operation 306, the at least one of the managed endpoint devices is monitored based on the update. The at least one of the managed endpoint devices may be notified by (i) identifying the at least one of the managed endpoint devices based on metadata provided with the update, and (ii) sending a message or otherwise indicating to the at least one of the managed endpoint devices that the update is available for them.

At operation 308, a copy of the update is provided to the at least one of the managed endpoint devices. The copy of the update may be provided in response to a request for the update received from the at least one of the managed endpoint devices. The at least one of the managed endpoint devices may provide the request based on the notification discussed with respect to operation 306. The copy of the update may be provided by (i) sending it via a message, (ii) storing it in storage that is accessible by the at least one of the managed endpoint devices, and/or via other processes.

Once obtained, the at least one of the managed endpoint devices may implement the update if the update is verifiable. After being applied, the now updated at least one of the managed endpoint devices may provide computer implemented services using the applied update. For example, the update may cause different software to be deployed, configurations to be changed, etc. These changes may cause computer implemented services of a different character to be provided after the update, and/or may only be different in smaller ways.

The method may end following operation 308.

Thus, using the method shown in FIG. 3, embodiments disclosed herein may facilitate application of updates to endpoint devices of edge infrastructure in a manner that reduces the likelihood of compromise of the edge infrastructure, orchestrator, and/or other components.

For example, the coordinating endpoint device selected for the group may implement stringent security protocols for communications, may implement strong anomaly/compromise detection frameworks, etc. However, in contrast to other endpoint devices, the selected endpoint device to take on this role may have sufficient available computing resources to implement these computationally expensive tasks. In contrast, the managed endpoint devices may not need to implement similar precautions by virtue of their more limited engagement with their environment (e.g., by only obtaining updates from the coordinating endpoint device). Thus, the managed endpoint devices may be able to dedicate a majority of their computing resources to providing desired computer implemented services without the additional overhead taken on by the coordinating endpoint device. Across a group of endpoint devices, the computing resource savings by only requiring a limited number of endpoint devices to take on this overhead may be substantial. Accordingly, the quality of the computer implemented services may be maintained while limiting computational overhead for various security functions (e.g., anti-virus, malware screening, communication security, etc.).

Figure 4:
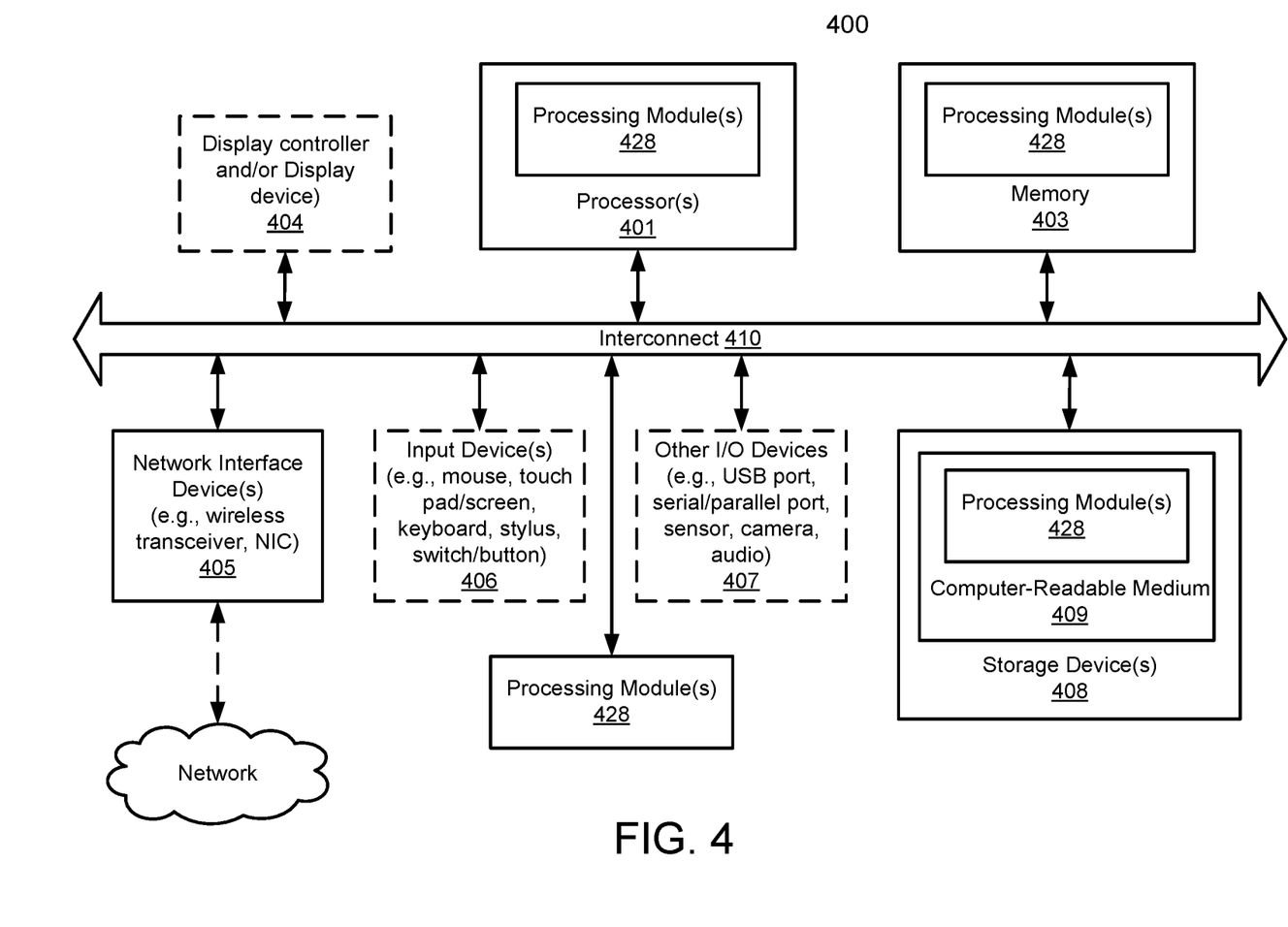
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of endpoint devices of a deployment, the method comprising:
   obtaining, by an endpoint device of the endpoint devices, assignment instructions indicating that the endpoint device is designated as a coordinating endpoint device that manages one or more managed endpoint devices among the endpoint devices;
   identifying, by the coordinating endpoint device, the one or more managed endpoint devices that are managed by the coordinating endpoint device;
   obtaining, by the coordinating endpoint device, an update from an orchestrator, the update being for at least one of the one or more managed endpoint devices;
   notifying, by the coordinating endpoint device and without the orchestrator, the at least one of the one or more managed endpoint devices of the update;
   providing, by the coordinating endpoint device and after obtaining the update from the orchestrator, a copy of the update to the at least one of the one or more managed endpoint devices of the update in response to a request for the update from the at least one of the one or more managed endpoint device to initiate updating of the at least one of the one or more managed endpoint devices; and
   providing computer implemented services using at least the at least one of the one or more managed endpoint devices that is updated using the update.

2. The method of claim 1, wherein the update is encrypted and signed by the orchestrator.

3. The method of claim 1, wherein the update is encrypted and is not decryptable by the endpoint device designated as the coordinating endpoint device.

4. The method of claim 3, wherein the update is decryptable using a decryption key maintained by the at least one of the one or more managed endpoint devices.

5. The method of claim 1, further comprising:
   prior to obtaining the update:
      initiating, by the endpoint device while operating as the coordinating endpoint device, monitoring for the update in response to identifying the managed endpoint devices; and
      after identifying that the update is available from the orchestrator, requesting, by the endpoint device while operating as the coordinating endpoint device, the update from the orchestrator.

6. The method of claim 1, wherein the copy of the update is provided via a secure channel between the endpoint device and the at least one of the one or more managed endpoint devices.

7. The method of claim 1, wherein the update is signed by orchestrator using a private key trusted by the at least one of the one or more managed endpoint devices.

8. The method of claim 1, wherein the orchestrator is configured to only provide updates for the at least one of the one or more managed endpoint devices to the endpoint device, and the orchestrator is not configured to communicate with the at least one of the one or more managed endpoint devices.

9. The method of claim 8, wherein the at least one of the one or more managed endpoint devices is configured to only communicate with the endpoint device while operating as the coordinating endpoint device.

10. A non-transitory machine-readable medium having instructions stored therein, which when executed by a processor, cause the processor to perform operations for managing operation of endpoint devices of a deployment, the operations comprising:
- obtaining, by an endpoint device of the endpoint devices, assignment instructions indicating that the endpoint device is designated as a coordinating endpoint device that manages one or more managed endpoint devices among the endpoint devices;
- identifying, by the coordinating endpoint device, the one or more managed endpoint devices that are managed by the coordinating endpoint device;
- obtaining, by the coordinating endpoint device, an update from an orchestrator, the update being for at least one of the one or more managed endpoint devices;
- notifying, by the coordinating endpoint device and without the orchestrator, the at least one of the one or more managed endpoint devices of the update;
- providing, by the coordinating endpoint device and after obtaining the update from the orchestrator, a copy of the update to the at least one of the one or more managed endpoint devices of the update in response to a request for the update from the at least one of the one or more managed endpoint device to initiate updating of the at least one of the one or more managed endpoint devices; and
- providing computer implemented services using at least the at least one of the one or more managed endpoint devices that is updated using the update.

11. The non-transitory machine-readable medium of claim 10, wherein the update is encrypted and signed by the orchestrator.

12. The non-transitory machine-readable medium of claim 11, wherein the update is not decryptable by the coordinating endpoint device.

13. The non-transitory machine-readable medium of claim 12, wherein the update is decryptable using a decryption key maintained by the at least one of the one or more managed endpoint devices.

14. The non-transitory machine-readable medium of claim 10, wherein the operations further comprise:
- prior to obtaining the update:
  - initiating, by the endpoint device while operating as the coordinating endpoint device, monitoring for the update in response to identifying the managed endpoint devices; and
  - after identifying that the update is available from the orchestrator, requesting, by the endpoint device while operating as the coordinating endpoint device, the update from the orchestrator.

15. The non-transitory machine-readable medium of claim 10, wherein the copy of the update is provided via a secure channel between the endpoint device and the at least one of the one or more managed endpoint devices.

16. The non-transitory machine-readable medium of claim 10, wherein the update is signed by orchestrator using a private key trusted by the at least one of the one or more managed endpoint devices.

17. The non-transitory machine-readable medium of claim 10, wherein the orchestrator is configured to only provide updates for the at least one of the one or more managed endpoint devices to the endpoint device, and the orchestrator is not configured to communicate with the at least one of the one or more managed endpoint devices.

18. The non-transitory machine-readable medium of claim 17, wherein the at least one of the one or more managed endpoint devices is configured to only communicate with the endpoint device while operating as the coordinating endpoint device.

19. An endpoint device, comprising:
- a processor; and
- a memory coupled to the processor to store instructions, which when executed by the processor, cause the processor to perform operations for managing operation of the endpoint device as a member of endpoint devices of a deployment, the operations comprising:
  - obtaining assignment instructions indicating that the endpoint device is designated as a coordinating endpoint device that manages one or more managed endpoint devices among the endpoint devices;
  - identifying, by the endpoint device as the coordinating endpoint device, the one or more managed endpoint devices that are managed by the coordinating endpoint device;
  - obtaining, by the endpoint device as the coordinating endpoint device, an update from an orchestrator, an update from an orchestrator, the update being for at least one of the one or more managed endpoint devices;
  - notifying, by the endpoint device as the coordinating endpoint device and without the orchestrator, the at least one of the one or more managed endpoint devices of the update; and
  - providing, by the endpoint device as the coordinating endpoint device and after obtaining the update from the orchestrator, a copy of the update to the at least one of the one or more managed endpoint devices of the update in response to a request for the update from the at least one of the one or more managed endpoint device to initiate updating of the at least one of the one or more managed endpoint devices.

20. The endpoint device of claim 19, wherein the update is encrypted and signed by the orchestrator.

* * * * *